United States Patent
Wang et al.

(10) Patent No.: US 9,681,125 B2
(45) Date of Patent: Jun. 13, 2017

(54) METHOD AND SYSTEM FOR VIDEO CODING WITH NOISE FILTERING

(75) Inventors: Lei Wang, Clovis, CA (US); Hongwei Zhu, Fresno, CA (US); Farzin Aghdasi, Clovis, CA (US); Greg Millar, Coarsegold, CA (US)

(73) Assignee: PELCO, INC, Clovis, CA (US)

( * ) Notice: Subject to any disclaimer, the term of this patent is extended or adjusted under 35 U.S.C. 154(b) by 422 days.

(21) Appl. No.: 13/340,564

(22) Filed: Dec. 29, 2011

(65) Prior Publication Data

US 2013/0170557 A1    Jul. 4, 2013

(51) Int. Cl.
*H04N 19/00* (2014.01)
*H04N 19/17* (2014.01)
(Continued)

(52) U.S. Cl.
CPC ............. *H04N 19/00* (2013.01); *G06T 7/11* (2017.01); *G06T 7/194* (2017.01); *G06T 7/254* (2017.01);
(Continued)

(58) Field of Classification Search
CPC .......... H04N 19/00; G06T 2207/20021; G06T 2207/20081; G06T 2207/20144; G06T 2207/20182; G06T 7/0079; G06T 7/2053
See application file for complete search history.

(56) References Cited

U.S. PATENT DOCUMENTS 4,015,366 A * 4/1977 Hall, III .................. 47/1.43
6,084,595 A 7/2000 Bach et al.
(Continued)

FOREIGN PATENT DOCUMENTS

| CN | 101681084 A | 3/2010 |
|---|---|---|
| EP | 2 071 514 | 6/2009 |

(Continued)

OTHER PUBLICATIONS

Fu, Songyin, Gangyi Jiang, and Mei Yu. "An effective background subtraction method based on pixel change classification." Proceedings of the 2010 International Conference on Electrical and Control Engineering. IEEE Computer Society, 2010.*

(Continued)

*Primary Examiner* — Sath V Perungavoor
*Assistant Examiner* — Patricia I Young
(74) *Attorney, Agent, or Firm* — Hamilton, Brook, Smith & Reynolds, P.C.

(57) ABSTRACT

A method of video coding includes receiving a video image having a plurality of pixels, selecting a plurality of Gaussian models for each pixel, classifying each pixel as a background or foreground pixel, determining if an object is always moving locally by detecting if an object is always moving within a predetermined distance and changing the direction of moving frequently for a second predetermined period of time, removing an object from classification as an object and ignoring motion of the object if the object is always moving locally, marking the area that the object moves within as a noisy area on a noise mask buffer, updating background models based on motion detection and noise filtering, updating current and evolving background images, and coding the current background image, background update blocks and objects for transmission.

15 Claims, 8 Drawing Sheets

(51) Int. Cl.

| | |
|---|---|
| *H04N 19/23* | (2014.01) |
| *H04N 19/107* | (2014.01) |
| *H04N 19/174* | (2014.01) |
| *G06K 9/00* | (2006.01) |
| *H04N 7/18* | (2006.01) |
| *H04N 5/225* | (2006.01) |
| *G06T 7/11* | (2017.01) |
| *G06T 7/254* | (2017.01) |
| *G06T 7/194* | (2017.01) |

(52) U.S. Cl.
CPC .......... *H04N 19/107* (2014.11); *H04N 19/17* (2014.11); *H04N 19/174* (2014.11); *H04N 19/23* (2014.11); *G06T 2207/20021* (2013.01); *G06T 2207/20081* (2013.01)

(56) References Cited

U.S. PATENT DOCUMENTS

| | | | |
|---|---|---|---|
| 6,205,260 | B1 | 3/2001 | Crinon et al. |
| 6,404,455 | B1 | 6/2002 | Ito et al. |
| 6,812,835 | B2 | 11/2004 | Ito et al. |
| 7,034,959 | B1 | 4/2006 | Takemoto |
| 7,295,228 | B2 | 11/2007 | Roberts et al. |
| 7,321,624 | B1 | 1/2008 | Allmen et al. |
| 7,356,166 | B2 * | 4/2008 | Hu ............................... 382/107 |
| 7,386,170 | B2 | 6/2008 | Ronk et al. |
| 7,391,907 | B1 | 6/2008 | Venetianer et al. |
| 7,760,908 | B2 | 7/2010 | Curtner et al. |
| 7,916,944 | B2 | 3/2011 | Yang et al. |
| 2001/0053248 | A1 * | 12/2001 | Maeda .......................... 382/165 |
| 2002/0051491 | A1 | 5/2002 | Challapali et al. |
| 2002/0181767 | A1 | 12/2002 | Deng et al. |
| 2004/0042674 | A1 | 3/2004 | Itokawa |
| 2005/0008198 | A1 | 1/2005 | Guo et al. |
| 2005/0047657 | A1 | 3/2005 | Lee |
| 2006/0262854 | A1 * | 11/2006 | Lelescu et al. .......... 375/240.16 |
| 2006/0284976 | A1 | 12/2006 | Girgensohn et al. |
| 2007/0052858 | A1 * | 3/2007 | Zhou et al. .................... 348/584 |
| 2007/0076957 | A1 | 4/2007 | Wang et al. |
| 2009/0034877 | A1 * | 2/2009 | Kefeder ........................ 382/298 |
| 2009/0087085 | A1 | 4/2009 | Eaton et al. |
| 2009/0087096 | A1 | 4/2009 | Eaton et al. |
| 2009/0153739 | A1 * | 6/2009 | Hong ............................. 348/620 |
| 2009/0192990 | A1 | 7/2009 | Chin et al. |
| 2009/0195382 | A1 | 8/2009 | Hall |
| 2009/0290020 | A1 * | 11/2009 | McLeish ............ G06K 9/00771 348/143 |
| 2010/0040303 | A1 * | 2/2010 | Bosco et al. .................. 382/261 |
| 2010/0111370 | A1 | 5/2010 | Black et al. |
| 2010/0166325 | A1 | 7/2010 | Sengamedu et al. |
| 2010/0177969 | A1 | 7/2010 | Huang et al. |
| 2010/0214425 | A1 * | 8/2010 | Huang ............... H04N 5/23248 348/208.99 |
| 2010/0296742 | A1 | 11/2010 | Chandrasekaran et al. |
| 2010/0309973 | A1 | 12/2010 | Chien et al. |
| 2011/0044536 | A1 | 2/2011 | Cobb et al. |
| 2011/0261264 | A1 * | 10/2011 | Zafarifar et al. ............. 348/699 |
| 2012/0162416 | A1 * | 6/2012 | Su ........................ G06T 7/2053 348/143 |
| 2012/0195363 | A1 | 8/2012 | Laganiere et al. |

FOREIGN PATENT DOCUMENTS

| | | |
|---|---|---|
| JP | 2001-211339 | 8/2001 |
| JP | 2010-278968 | 12/2010 |
| WO | WO2005/099270 | 10/2005 |

OTHER PUBLICATIONS

Fu, Songyin, Gangyi Jiang, and Mei Yu. "An effective background subtraction method based on pixel change classification." Electrical and Control Engineering (ICECE), 2010 International Conference on. IEEE, 2010.*
PCT/US2012/071707 International Preliminary Report on Patentability dated Jul. 10, 2014 entitled "Method and System for Video Coding With Noise Filtering of Foreground Object Segmentation."
Fu, S., et al., "An Effective Background Subtraction Method Based on Pixel Change Classification," 2010 International Conference on Electrical and Control Engineering, 4634-4637 (2010).
Matsuyama, T., et al, "Background Subtraction for Non-Stationary Scenes," Conference: Asian Conference on Computer Vision—ACCV, (2000).
Name, X. Z., et al. "Moving Target Detection in Complex Scenes Based on Spatio-Temporal Domain Analysis," 2010 3rd International Congress on Image and Signal Processing (CISP 2010), 1520-1523 (2010).
PCT Application No. PCT/US2011/0066974 titled Inference Engine for Video Analytics Metadata-Based Event Detection and Forensic Search, Written Opinion dated Sep. 14, 2012.
PCT Application No. PCT/US2011/0066974 titled Inference Engine for Video Analytics Metadata-Based Event Detection and Forensic Search, International Search Report dated Sep. 14, 2012.
PCT Application No. PCT/US2011/066956 titled Tracking Moving Objects Using a Camera Network, Written Opinion dated Sep. 19, 2012.
PCT Application No. PCT/US2011/066956 titled Tracking Moving Objects Using a Camera Network, International Search Report Sep. 19, 2012.
PCT Application No. PCT/US2011/067732 titled Searching Recorded Video, Written Opinion dated Aug. 9, 2012.
PCT Application No. PCT/US2011/067732 titled Searching Recorded Video, International Search Report dated Aug. 9, 2012.
PCT Application No. PCT/US2011/067787 titled Video Coding, International Search Report dated Aug. 9, 2012.
PCT Application No. PCT/US2011/067787 titled Video Coding, Written Opinion dated Aug. 9, 2012.
PCT Application No. PCT/US2011/067872 titled Color Similarity Sorting for Video Forensics Search, Written Opinion dated Jul. 24, 2012.
PCT Application No. PCT/US2011/067872 titled Color Similarity Sorting for Video Forensics Search, International Search Report dated Jul. 24, 2012.
PCT Application No. PCT/US2012/071707 titled "Method and System for Video Coding With Noise Filtering of Foreground Object Segmentation," Notification of Transmittal of the International Search Report and Written Opinion of the International Searching Authority, or the Declaration dated May 2, 2013.
Strat, T.M., "Object-Based Encoding: Next-Generation Video Compression," 2001 Proceedings of Workshop and Exhibition on MPEG-4, 53-57.
Toyama, K., et al., "Wallflower: Principles and Practice of Background Maintenance," Computer Vision, The 7th IEEE International Conference on Keryra, Greece, 1(20): 255-261 (1999).
U.S. Appl. No. 12/982,601 titled Searching Recorded Video, Office Action dated Jun. 5, 2013.
U.S. Appl. No. 12/982,601 titled Searching Recorded Video, Office Action dated Dec. 5, 2012.
U.S. Appl. No. 12/982,602 titled Video Coding, Office Action dated Feb. 27, 2013.
Wixson, L., et al., "Detecting Salient Motion by Accumulating Directionally-Consistent Flow," Computer Vision, 1999 The Proceedings of the 7th IEEE International Conference on Keryra, Greece, 2(2): 797-804 (1999).
Journal of Chongqing University, vol. 34, Issue 12: 115-120 (Dec. 15, 2011).

* cited by examiner

METHOD AND SYSTEM FOR VIDEO CODING WITH NOISE FILTERING

CROSS REFERENCES

This application is related to U.S. patent application Ser. No. 12/982,601, entitled "Searching Recorded Video" filed on Dec. 30, 2010, the entire disclosure of which is incorporated by reference for all purposes.

This application is related to U.S. patent application Ser. No. 12/982,602, entitled "Video Coding" filed on Dec. 30, 2010, the entire disclosure of which is incorporated herein by reference for all purposes.

BACKGROUND

In recent years, use of High Definition (HD) video technology has grown exponentially, and spread into many different areas. For example, many movies, television programming, and online video streams are now routinely presented in high definition. HD video technology is also increasingly being used in the area of surveillance and wireless communications. For instance, HD capable cameras can provide highly detailed video streams, and enable the effective monitoring of remote sites, such as industrial parks.

HD video for surveillance and wireless communication applications use significant amounts of bandwidth. Some remote sites, however, can at most, reliably deliver a bandwidth of 128 Kbps. Such bandwidth capacities can make delivering high quality video streams nearly impossible.

To help facilitate the use of HD video, many video compression schemes (e.g., MPEG-1/2, MPEG-4, and H.264) exist to reduce the size of raw high definition video.

In general, low bandwidth and high resolution contradict each other in the field of video coding and transmission. Object-based coding, in which only objects that move are coded and transmitted at a high frame or update rate, can be utilized to save bandwidth. However, it is difficult to identify if a potential or candidate object is a real object or noise in the background of the scene. Accordingly, there has been a need for a method and system to provide techniques for effectively identifying noise and coding video background.

SUMMARY

An example of a method of video coding includes receiving a video image having a plurality of pixels, selecting a plurality of Gaussian models for each pixel in the plurality of pixels in the image, classifying each pixel as a background pixel or foreground pixel based on the probability of the model that the pixel fits best, dividing the image into M×M pixel blocks, comparing for each block the motion pixels in the current frame with motion pixels in the previous frame to determine if the number of pixels with motion change is greater than a first threshold; triggering a counter for a block if the number of pixels with motion change is greater than the first threshold, determining if an accumulated count in the counter in a first predetermined period of time is larger than a second threshold, ignoring all motion in a block if the accumulated count in the counter in a first predetermined period of time is larger than the second threshold, tracking objects in the image, determining if an object is always moving locally by detecting if an object is always moving within a predetermined distance and changing the direction of moving frequently for a second predetermined period of time, removing an object from classification as an object if the determining step determines that an object is always moving locally, ignoring the motion of an object if the determining step determines that an object is always moving locally and marking the area that the object moves within as a noisy area on a noise mask buffer, updating background models based on motion detection and noise filtering, updating a current background image, updating an evolving background image, and coding the current background image, background update blocks and objects for transmission.

Implementations of such a method may include one or more of the following features. The method further includes the steps of creating a queue to buffer a plurality of entries in the queue including objects, background blocks and images that need to be updated, providing frame and object identifiers to entries in the queue, determining if an object is a true object, determining if an object is in a queue for a period of time greater than a third predetermined period of time, and removing an object from a buffer if the object has not been identified as a true object and it has been determined that the object has been in a queue for a period of time greater than the third predetermined period of time. A method in which the step of receiving a video image having a plurality of pixels includes receiving a video image that was captured by a camera viewing a scene and the method further includes the steps of determining if an object has moved into the scene and stopped in the scene, and if the step for determining if an object has moved into the scene and stopped in the scene determines that a first object has moved into the scene and stopped, updating a background model of the scene and coding the first object as background. The method further includes the steps of establishing a current background image as a reference image for coding and decoding, establishing an evolving background image, updating the current background image with the still objects detected, updating the evolving background image with received images based on motion detection, and replacing the current background image with the evolving background image. The method further includes the steps of using a long-term counter with each Gaussian model to determine if a current pixel is a foreground pixel, using a short-term counter with each Gaussian model to determine which Gaussian model to use for the pixel of the current background image, if a pixel is detected as a background pixel, updating the corresponding evolving background model with a moving average method, if an object is detected as a still object, updating the pixels in the area in the current frame into the current background image and evolving background image, if an object is detected as a still object, maximizing the short-term counters of the Gaussian models corresponding to the pixels in the area of the current frame and updating the long-term counters to ensure that the pixels will be classified as background pixels, and if a pixel is detected as a background pixel and the background model for the pixel is different to the pixel in the previous frame, updating the pixel of both of the current and evolving background image and coding and transmitting the updated current background pixels. The step of coding the current background image, background update blocks and objects for transmission includes using a current background image and a previous decoded frame as potential reference images;

An example of a system for video coding includes a processor adapted to receive a video image having a plurality of pixels, select a plurality of Gaussian models for each pixel in the plurality of pixels in the image, classify each pixel as a background pixel or foreground pixel based on the probability of the model that the pixel fits best divide the image into M×M pixel blocks, compare for each block the motion pixels in the current frame with motion pixels in the previous frame to determine if the number of pixels with motion change is greater than a first threshold, trigger a counter for a block if the number of pixels with motion change is greater than the first threshold, determine if an accumulated count in the counter in a first predetermined period of time is larger than a second threshold, ignore all motion in a block if the accumulated count in the counter in a first predetermined period of time is larger than the second threshold, track objects in the image, determine if an object is always moving locally by detecting if an object is always moving within a predetermined distance and changing the direction of moving frequently for a second predetermined period of time, remove an object from classification as an object if the processor determines that an object is always moving locally, ignore the motion of an object if the determining step determines that an object is always moving locally and marking the area that the object moves within as a noisy area on a noise mask buffer, update background models based on motion detection and noise filtering, update a current background image, update an evolving background image and code the current background image, background update blocks and objects for transmission.

Implementations of such a system may include one or more of the following features. The processor is further adapted to create a queue to buffer a plurality of entries in the queue including objects, background blocks and images that need to be updated; providing frame and object identifiers to entries in the queue, determine if an object is a true object, determine if an object is in a queue for a period of time greater than a third predetermined period of time, and remove an object from a buffer if the object has not been identified as a true object and it has been determined that the object has been in a queue for a period of time greater than the third predetermined period of time. The processor is further adapted to receive a video image that was captured by a camera viewing a scene and to determine if an object has moved into the scene and stopped in the scene, and if the processor determines that a first object has moved into the scene and stopped, to update a background model of the scene and to code the first object as background. The processor is further adapted to establish a current background image as a reference image for coding and decoding, establish an evolving background image, update the current background image with the still objects detected, update the evolving background image with received images based on motion detection, and replace the current background image with the evolving background image. The processor is further adapted to use a long-term counter with each Gaussian model to determine if a current pixel is a foreground pixel, use a short-term counter with each Gaussian model to determine which Gaussian model to use for the pixel of the current background image, if a pixel is detected as a background pixel, to update the corresponding evolving background model with a moving average method, if an object is detected as a still object, to update the pixels in the area in the current frame into the current background image and evolving background image, if an object is detected as a still object, to maximize the short-term counters of the Gaussian models corresponding to the pixels in the area of the current frame and to update the long-term counters to ensure that the pixels will be classified as background pixels, and if a pixel is detected as a background pixel and the background model for the pixel is different to the pixel in the previous frame, to update the pixel of both of the current and evolving background image and coding and transmitting the updated current background pixels. The processor is further adapted to use a current background image and a previous decoded frame as potential reference images.

An example of a non-transitory computer readable medium includes instructions configured to cause a processor to receive a video image having a plurality of pixels, selecting a plurality of Gaussian models for each pixel in the plurality of pixels in the image, classify each pixel as a background pixel or foreground pixel based on the probability of the model that the pixel fits best; divide the image into M×M pixel blocks, compare for each block the motion pixels in the current frame with motion pixels in the previous frame to determine if the number of pixels with motion change is greater than a first threshold, trigger a counter for a block if the number of pixels with motion change is greater than the first threshold, determine if an accumulated count in the counter in a first predetermined period of time is larger than a second threshold, ignore all motion in a block if the accumulated count in the counter in a first predetermined period of time is larger than the second threshold, track objects in the image, determine if an object is always moving locally by detecting if an object is always moving within a predetermined distance and changing the direction of moving frequently for a second predetermined period of time, remove an object from classification as an object if the processor determines that an object is always moving locally, ignore the motion of an object if the processor determines that an object is always moving locally and marking the area that the object moves within as a noisy area on a noise mask buffer, update background models based on motion detection and noise filtering, update a current background image, update an evolving background image, and code the current background image, background update blocks and objects for transmission.

Implementations of such a non-transitory computer readable medium may include one or more of the following features. The non-transitory computer readable medium further includes instructions configured to cause the processor to create a queue to buffer a plurality of entries in the queue including objects, background blocks and images that need to be updated, provide frame and object identifiers to entries in the queue, determine if an object is a true object, determine if an object is in a queue for a period of time greater than a third predetermined period of time, and remove an object from a buffer if the object has not been identified as a true object and it has been determined that the object has been in a queue for a period of time greater than the third predetermined period of time. The non-transitory computer readable medium further includes instructions configured to cause the processor to receive a video image that was captured by a camera viewing a scene, determine if an object has moved into the scene and stopped in the scene, and if the processor determines that a first object has moved into the scene and stopped, update a background model of the scene and code the first object as background. The non-transitory computer readable medium further includes instructions configured to cause the processor to establish a current background image as a reference image for coding and decoding, establish an evolving background image, update the current background image with the still objects detected, update the evolving background image with received images based on motion detection, and replace the current background image with the evolving background image. The non-transitory computer readable medium further includes instructions configured to cause the processor to use a long-term counter with each Gaussian model to determine if a current pixel is a foreground pixel, use a short-term counter with each Gaussian model to determine which Gaussian model to use for the pixel of the current background image, if a pixel is detected as a background pixel, to update the corresponding evolving background model with a moving average method, if an object is detected as a still object, to update the pixels in the area in the current frame into the current background image and evolving background image, if an object is detected as a still object, to maximize the short-term counters of the Gaussian models corresponding to the pixels in the area of the current frame and to update the long-term counters to ensure that the pixels will be classified as background pixels, and if a pixel is detected as a background pixel and the background model for the pixel is different to the pixel in the previous frame, to update the pixel of both of the current and evolving background image and coding and to transmit the updated current background pixels. The instructions configured to cause the processor to of code the current background image, background update blocks and objects for transmission comprise instructions configured to cause the processor to use a current background image and a previous decoded frame as potential reference images.

Certain implementations of such a computer readable medium can include one or more of the following features. The instructions that cause the processor to process data based on a determined data type cause the processor to decode the data to produce a decoded object image; and store the decoded object image in an objects list.

Items and/or techniques described herein can provide one or more of the following capabilities, as well as other capabilities not mentioned. In some implementations, high definition video with acceptable frame rates can be coded and distributed over low bandwidth connections. It may be possible for an effect noted above to be achieved by means other than that noted, and a noted item/technique may not necessarily yield the noted effect.

The processes and systems described herein, and the attendant advantages, applications, and features thereof, will be more fully understood by a review of the following detailed description, figures, and claims.

In the figures, components with similar relevant characteristics and/or features can have the same reference label.

DETAILED DESCRIPTION

Techniques are discussed herein for providing mechanisms for coding and transmitting high definition video, e.g., over low bandwidth connections. In particular, foreground-objects are identified as distinct from the background of a scene represented by a plurality of video frames. In identifying foreground-objects, semantically significant and semantically insignificant movement (e.g., non-repetitive versus repetitive movement) is differentiated. For example, the swaying motion of a tree's leaves being minor and repetitive, can be determined to be semantically insignificant and to belong in a scene's background. Processing of the foreground-objects and background proceed at different update rates or frequencies. For example, foreground-objects can be updated 30 or 60 times per second. By contrast, a background is updated less frequently, e.g., once every 10 seconds. In some implementations, if no foreground-objects are identified, no live video is transmitted (e.g., if no motion is detected, static images are not configured to be repeatedly sent).

Techniques described herein take advantage of the fact that, in the area of surveillance and wireless communications, updating video of semantically significant movement at a high frame rate is sufficient. While many coding schemes are optimized for entertainment applications, in surveillance applications, minor and repetitive changes in a video's background, such as the waving of a flag, are typically not important. By omitting the transmission of semantically insignificant movement in the background, and by reducing the rate at which the background is updated, the transmission of high definition video over low bandwidth connections is facilitated.

Techniques described herein can be used to communicate high definition video over various communication systems. For example, high definition video can be transmitted over various wired and wireless communications systems, such as Ethernet-based, Coaxial-based, Powerline-based, WiFi-based (802.11 family standards), Code Division Multiple Access (CDMA), Time Division Multiple Access (TDMA), Frequency Division Multiple Access (FDMA), Orthogonal FDMA (OFDMA), Single-Carrier FDMA (SC-FDMA) systems, etc.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). A wireless communication network does not have all communications transmitted wirelessly, but is configured to have at least some communications transmitted wirelessly.

Figure 1:
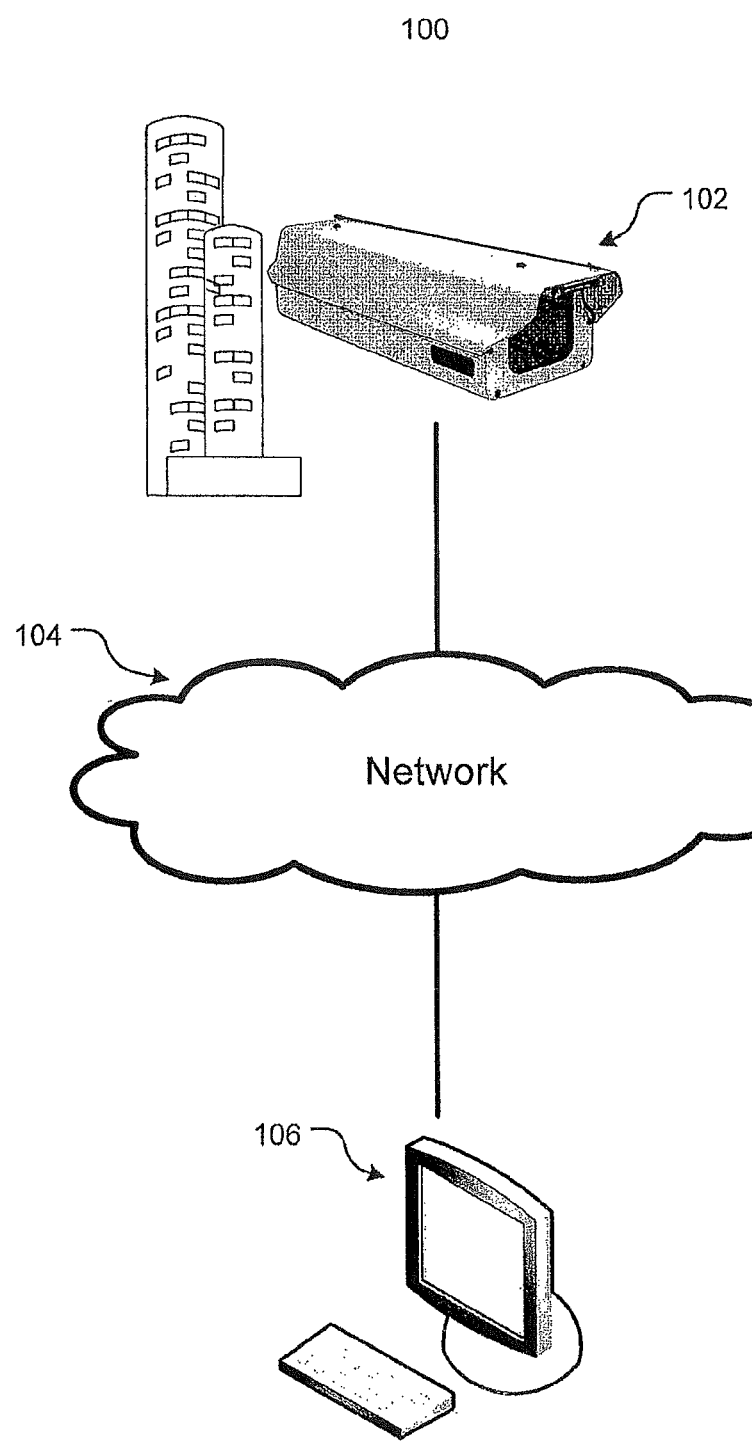
FIG. 1 is a simplified diagram of a high definition video transmission system, including a transmitter and a receiver.

Referring to FIG. 1, a simplified diagram of a video transmission system, including a transmitter and a receiver, is shown. Video transmission system 100 includes transmitter 102, network 104, and receiver 106. Transmitter 102 is preferably a device for encoding and transmitting, for example, high definition video. For example, transmitter 102 can be a video capturing device (for example, a computing device including a camera, an intelligent camera, a video grabber, and others of the same type), a computing device (for example, desktop computer, laptop, tablet device, computer server, a video transcoder, and others of the same type) connected to one or more video capturing devices (for example, external cameras) and/or video encoding devices, a module of a video capturing device, a module of a computing device, and/or the like. For example, transmitter 102 can be a module embedded within a camera or a module of a video transcoder. As used herein, video includes full-motion video and still photographs taken at intervals. Receiver 106 is preferably a device for receiving and decoding, for example, high definition video. Receiver 106 can be, for example, a desktop computer, a laptop, a tablet device, a computer server, a mobile device, a mobile telephone, a monitoring system, and/or the like.

Network 104 is preferably any suitable network for facilitating communications between two or more devices. For example, network 104 can be a closed loop communications system, a local area network (such as an intranet), a wide area LAN (such as, the Internet), and/or the like. Transmitter 102 is configured to transmit encoded images and other data to receiver 106 through network 104. For example, transmitter 102 can provide receiver 106 with a series of encoded images that can be decoded into a video stream (for example, high definition video) for presentation to a user. To support the encoding and decoding of images, transmitter 102 can further provide event information (for example, an indication that a new object has appeared in a video stream, and so forth) to receiver 106.

Figure 2:
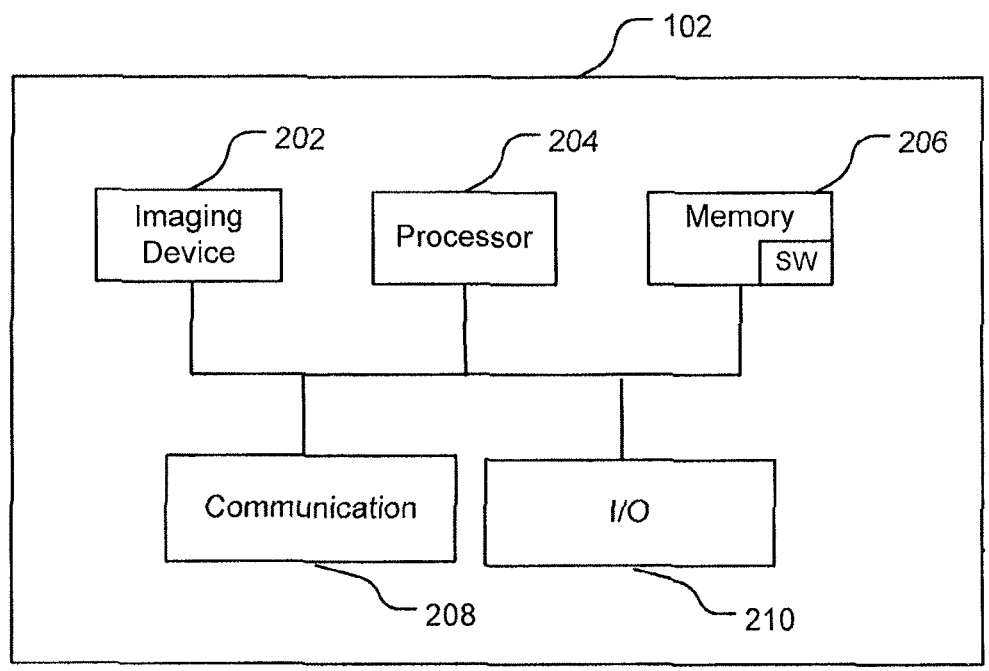
FIG. 2 is an exemplary block diagram of components of the transmitter shown in FIG. 1.

Referring to FIG. 2, transmitter 102 includes imaging device 202, processor 204, memory 206, communication subsystem 208, and input/output (I/O) subsystem 210. Processor 204 is preferably an intelligent hardware device, for example, a central processing unit (CPU), such as those made by the Intel® Corporation, AMD®, ARM™, a microcontroller, an application specific integrated circuit (ASIC), a digital signal processor (DSP) (for example, Texas Instrument's DaVinci™ family DSPs), and others of the same type. Memory 206 includes a physical and/or tangible storage medium. Such a medium can take many forms, including but not limited to, non-volatile media and volatile media. Non-volatile media include, for example, optical and/or magnetic disks, such as read-only memory (ROM). Illustratively, non-volatile media can be a hard drive, flash drive, and/or the like. Volatile media include, without limitation, various types of random access memory (RAM). Illustratively, volatile media can be dynamic random access memory (DRAM), static random access memory (SRAM), and/or the like. Memory 206 stores computer-readable, computer-executable software code containing instructions that are configured to, when executed, cause processor 204 to perform various functions described herein. The functions implement a video transmission system. In some implementations, memory 206 can store object and background images. For example, memory 206 can store the images of foreground-objects detected in a plurality of frames received from imaging device 202. Memory 206 can further store an objects list that includes identifiers, object images, references, and/or other attributes corresponding to each detected foreground-object.

Imaging device 202 is preferably any suitable combination of hardware and/or software for capturing raw video data, for example, devices based on charge-coupled device (CCD), complementary metal oxide semiconductor (CMOS) image sensor technologies, and/or thermal imaging sensors, etc. Transmitter 102 can include any number of imaging devices (including zero).

Transmitter 102 can additionally or alternatively receive raw or encoded video data from external video capturing devices and/or video encoding devices (for example, external cameras, computing devices generating encoded video, and so forth) that are directly connected to one or more ports of communication subsystem 208 and/or one or more ports of I/O subsystem 210.

Figure 3:
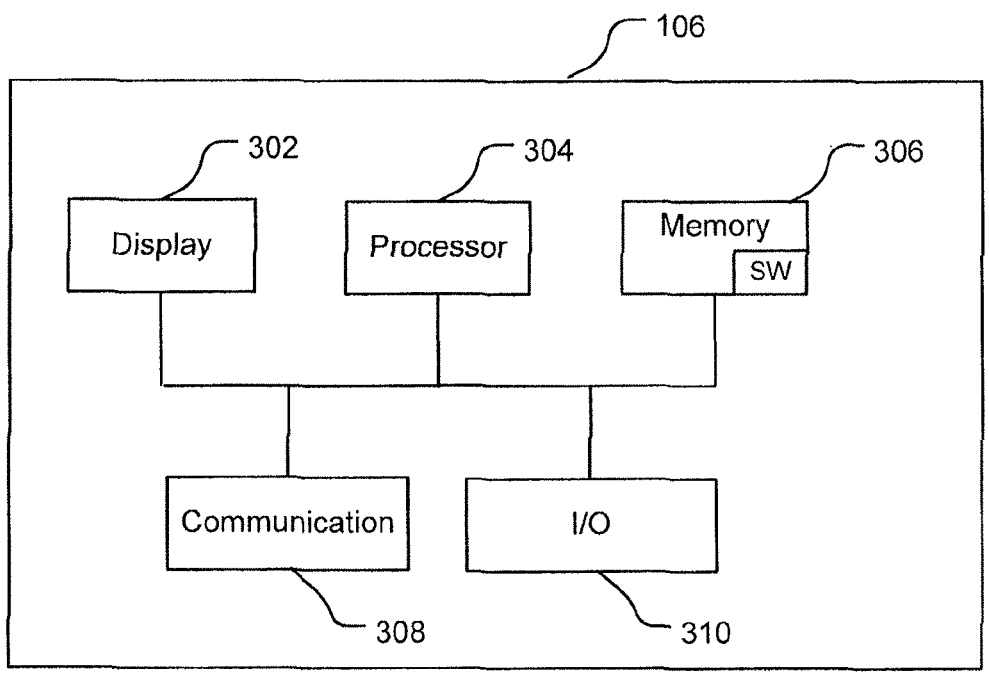
FIG. 3 is an exemplary block diagram of components of the receiver shown in FIG. 1.

Communication subsystem 208 is preferably any suitable combination of hardware and/or software for communicating with other devices (for example, receiver 106 shown in FIG. 3, other cameras, and others of similar type). Communication subsystem 208 can be configured to connect to, for example, a closed-loop communications system, a local area network (for example, an intranet), a wide area network (for example, the Internet), and others of similar type. I/O subsystem 210 is preferably any suitable combination of hardware and/or software for managing communications with and/or the operations of input/output devices.

Video data received by transmitter 102 can be encoded or compressed into a digital format by processor 204. For example, transmitter 102 can perform analysis on, identify foreground-object and background portions in, encode, and transmit data according to one or more update rates. Encoded video data can be streamed or transmitted to receiver 106 via network 104.

Referring to FIG. 3, receiver 106 includes display 302, processor 304, memory 306, communication subsystem 308, and I/O subsystem 310. Processor 304 is preferably an intelligent hardware device, for example, a central processing unit (CPU) such as those made by the Intel® Corporation, AMD®, ARM™, a microcontroller, an application specific integrated circuit (ASIC), a digital signal processor (DSP), and others of similar type. Memory 306 includes a physical and/or tangible storage medium. Such a medium can take many forms, including but not limited to, non-volatile media and volatile media. Non-volatile media include, for example, optical and/or magnetic disks, such as read-only memory (ROM). Illustratively, non-volatile media can be a hard drive, flash drive, and/or the like. Volatile media include, without limitation, various types of random access memory (RAM). Illustratively, volatile media can be dynamic random access memory (DRAM), static random access memory (SRAM), and/or the like. Memory 306 stores computer-readable, computer-executable software code containing instructions that are configured to, when executed, cause processor 304 to perform various functions described herein. The functions implement a video transmission system. In some implementations, memory 306 can store foreground-object and background images. For example, memory 306 can store the images of foreground-objects. Memory 306 can further store an objects list that includes identifiers, object images, references, and/or other attributes corresponding to each detected foreground-object.

Communication subsystem 308 preferably is any suitable combination of hardware and/or software for communicating with other devices (for example, the transmitter shown in FIG. 3). Communication subsystem 308 can be configured to connect to, for example, a closed-loop communications system, a local network, a wide area network (for example, the Internet), and others of similar type. Display 302 is preferably any suitable device for displaying images to a user, such as a cathode ray tube (CRT) monitor, a liquid crystal display (LCD) monitor, a plasma-based monitor, a projector, and others of similar type. I/O subsystem 310 is preferably any suitable combination of hardware and/or software for managing communications with and/or the operations of input/output devices, such as a keyboard, mouse, touchpad, scanner, printer, camera, and others of similar type. Devices such as a keyboard, mouse, and touchpad can be utilized by a user to provide user input to processor 304 to provide user selection choices on foreground objects to be stitched to a background image for display or use by a user as discussed in detail below.

While the various configurations described herein are directed to the transmission of high definition video, it should be appreciated that modifications can be made to cover other contexts. For example, modifications can be made to enable RADAR, LIDAR and other object based detection monitoring over low bandwidth connections.

Figure 4:
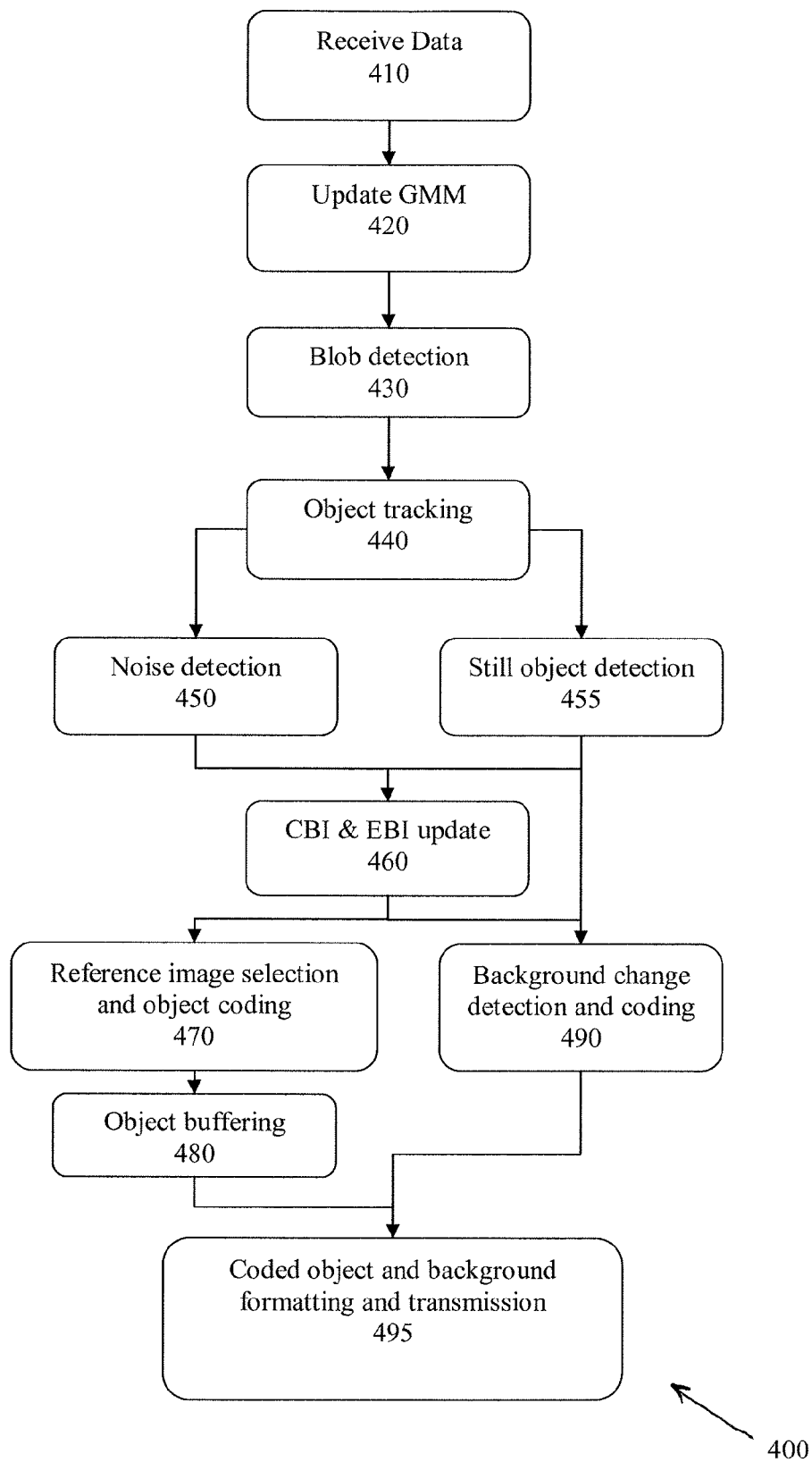
FIG. 4 is a block flow diagram of an exemplary process for encoding video.

Referring to FIG. 4, with further reference to FIGS. 1 and 2, process 400 for encoding video includes the blocks shown. Process 400 is, however, exemplary only and not limiting. Process 400 can be altered, e.g., by having blocks added, removed, rearranged, and/or performed concurrently. For example, blocks 1070 and 1090 for processing foreground-objects and background can be performed concurrently. Still other alterations to process 400 as shown and described are possible.

Process 400 can begin at block 410 by receiving a video frame from a video source, such as an imaging device. At block 420, process 400 applies a Gaussian mixture model for excluding static background images and images with semantically insignificant motion (e.g., a flag waving in the wind). In this Gaussian mixture model, N Gaussian models are selected for each pixel and the current pixel is classified to be a foreground pixel or background pixel based on the probability of the model that the current pixel fits best. If a model appears more frequently than other models, the pixel will be classified as a background pixel; otherwise, the pixel will be classified as a foreground pixel. The foreground pixels are grouped into objects and tracked through frames to filter out various noise. At block 430, the foreground motion pixels are grouped into blobs by utilizing a connected component analysis method. At block 440, the labeled blobs are tracked in a plurality of consecutive frames. At block 450, the tracked objects are further analyzed to detect noise in the scene which is not very informative and not necessary to be updated. At block 455, the still objects will be detected which will be updated into the background quickly to save transmission bandwidth. At block 460, the current background image and evolving background image are updated based on the detection of foreground objects, noise, and still objects. At block 470, the reference image is selected from the current background image and previous frame, and the tracked objects are differentially coded with the residual objects. At block 480, the coded objects are buffered for further noise analysis. If the objects are identified as frequently happening local events, such as a moving tree branch or flag waving, these objects will be removed from the object buffer. At block 490, the background change due to environmental changes such as new objects entering and staying still in the scene will be merged into the current and evolving background images and the corresponding change will be coded with the residue image block subtracted from the previous current frame. At block 495, all of the informative objects and background change parts will be formatted and transmitted. Additional information is also transmitted. For example, object events, such as the appearance, loss, or movement of an object in a given frame, can be transmitted. This kind of information is called video content metadata. Based on the application of the Gaussian model, foreground-objects (that is, objects of interest) can be identified in the received frame as distinct from the frame's background. At block 495, foreground-objects are processed based on a first update rate. For example, an update rate can specify that foreground-objects are to be updated in a video stream produced by a receiver at 30 frames per second. As a result, encoded object images for identified foreground-objects are generated and transmitted based on a rate of 30 frames per second (that is, encoded images are generated and transmitted in a manner so that a receiver can receive the images and generate a video stream with foreground-objects that are updated at a rate of 30 frames per second). At block 495, portions of the frame identified as a part of the background are processed based on a second update rate. For example, an update rate may specify that a background is to be updated every fifteen seconds. As a result, an encoded background image is generated and transmitted once every fifteen seconds.

Figure 5:
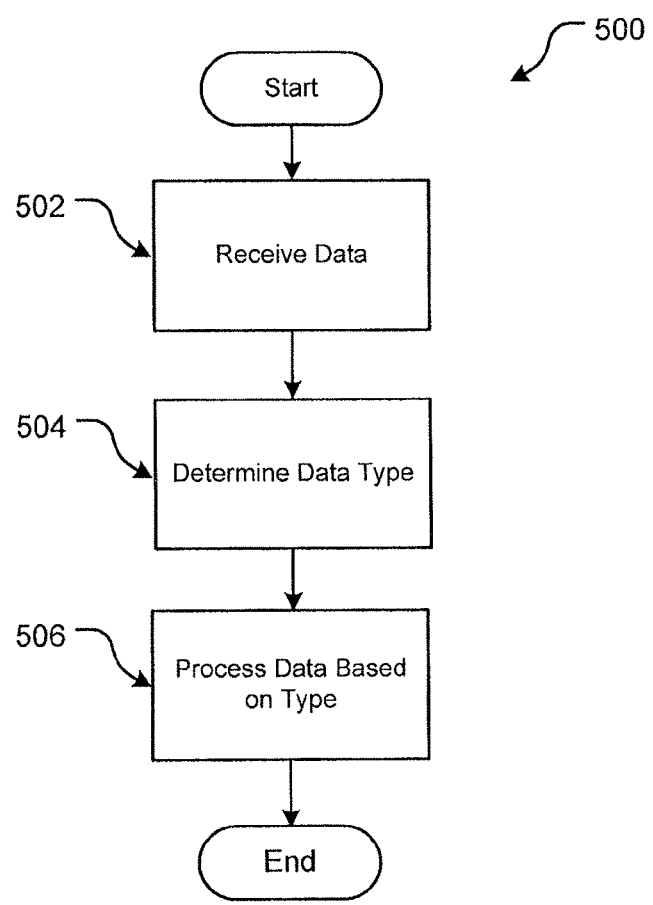
FIG. 5 is a block flow diagram of an exemplary process for decoding video.

Referring to FIG. 5, with further reference to FIGS. 1 and 3, process 500 for decoding of video includes the blocks shown. The process 500 is, however, exemplary only and not limiting. The process 500 can be altered, e.g., by having blocks added, removed, rearranged, and/or performed concurrently.

Process 500 can begin at block 502 by receiving data. Data can include encoded images and/or event information. At block 504, process 500 can determine a data type for the received data. Data types can include event, background, moving object, and still object types. At block 506, the received data is processed based on the identified object type. For example, if the data is of an event type, objects can be added or removed from an objects list, which is used for the tracking of objects within the frames of a video stream. As another example, if the data is of a background type, the data can be decoded and stitched to foreground-objects in order to generate a video frame that can be presented to a user. As still another example, if the data is of an object type, the data can be decoded and stitched with other images (for example, other object images, a background image, and others of similar type) in order to generate a video frame that can be presented to a user.

As a result of processes 400 and 500, a video stream including a plurality of video frames can be presented to a user via a receiver, such as a computer workstation. The video stream can include foreground-objects updated at a first rate and a background updated at a second rate. For example, a video stream lasting twenty minutes can include frames numbered from 0 to 36,000. Moving foreground-objects in the video stream can be configured to be updated at a rate of 30 frames per second. As such, each of the 36,000 frames generated by the receiver includes updated moving foreground-objects. In order to maintain such an update rate, foreground-object image data can be received and processed by the receiver at a rate of 30 times per second. A background in the video stream, by contrast, can be configured to be updated once every 10 minutes. As such, only frames 0, 18,000, and 36,000 include updates to the background.

Further understanding can be had by examining the more detailed processes shown in FIGS. 6-9.

Figure 6:
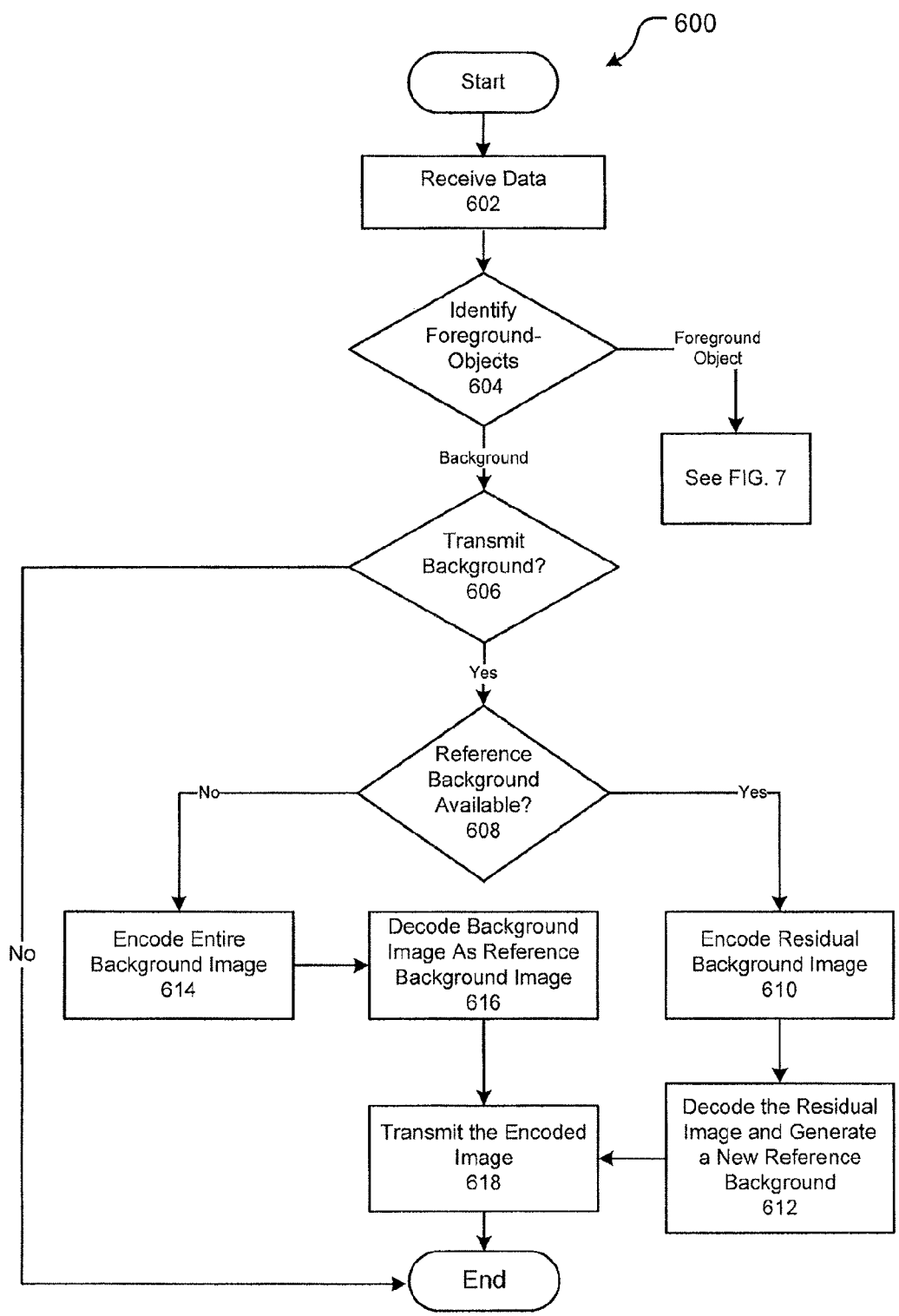
FIG. 6 is a block flow diagram of an exemplary process for encoding and transmitting a background image.

Referring to FIG. 6, with further reference to FIGS. 1 and 2, process 600 for transmitting a background includes the blocks shown. Process 600 is, however, exemplary only and not limiting. Process 600 can be altered, for example, by having blocks added, removed, rearranged, and/or performed concurrently. For example, block 618 for transmitting an encoded image can be performed before block 616. Still other alterations to process 600 as shown and described are possible.

At block 602, transmitter 102 receives a video frame (for example, raw video data, encoded video data) from a suitable video source. For example, a frame can be captured by an image sensor of imaging device 202. As another example, a frame can be received via I/O subsystem 210 and/or communication subsystem 208 (for example, via an Ethernet port, USB port, or wireless connection of the subsystems). Video frames can be received at regular intervals or at certain frame rates. For example, the transmitter can receive frames at 30 frames per second.

At block 604, processor 204 of transmitter 102 identifies foreground-objects in the received frame. In doing so, the background portion of the received frame can be determined. In particular, a scene analyzer algorithm can be implemented in processor 204. Processing by the scene analyzer is described in detail in U.S. patent application Ser. No. 12/982,601, entitled "Searching Recorded Video" filed on Dec. 30, 2010, incorporated in the cross-reference section of this application. In short, the analyzer can utilize a Gaussian mixture model for excluding static background images and images with repetitive motion without semantic significance (for example, trees swaying in the wind) to identify foreground-objects. While the scene analyzer is described as utilizing a Gaussian mixture model, any model that captures stable pixels over a short period can be used.

At decision 606, processor 204 performs a determination as to whether an encoded background image should be transmitted to receiver 106. Processor 204 makes such a determination based on a set of criteria, such as a predefined update rate. Illustratively, an operator of transmitter 102 can specify that background images are to be updated at receiver 106 every ten minutes. As a result, processor 204 generates and sends encoded background images once every ten minutes. Processor 204 can additionally or alternatively be configured to automatically adjust the rate at which background images are encoded and transmitted. For example, processor 204 can be configured to automatically adjust the rate based on the currently available bandwidth over network 104.

At decision 608, processor 204 determines whether a current reference background image is available. For instance, processor 204 can check whether a current reference background image is stored in a buffer of memory 206. The current reference background image can be, for example, a decoded background image of a previously received frame.

If processor 204 determines that a reference background image is available, processor 204 encodes a residual background image for the received frame at block 610. Specifically, processor 204 determines the differences (for example, via performing an image subtraction process) between the background portion of the received frame and the current reference background image. Processor 204 thereafter encodes the residual background image for the background portion using a suitable coding scheme, such as H.264 intra-coding, JPEG (Joint Photographic Experts Group), JPEG 2000, and others of similar type. Because residual background images typically contain low entropy, the encoded residual background image can be highly compressed.

At block 612, processor 204 decodes the encoded residual background image generated at block 610. Processor 204 thereafter generates a new reference background image using the decoded residual background image and the current reference background image. After generating the new reference background, processor 204 stores the image in a buffer of memory 206. The new reference background image can be used for the processing of later received frames. By decoding and generating new reference background images in this manner, processor 204 synchronizes its background images with the background images generated at receiver 106. More specifically, encoding and decoding processes often produce images with quantization errors, which can cause original images and their decoded counterparts to differ. In order to avoid this issue and maintain accurate decoding, processor 204 performs processes to obtain the same decoded images as those generated by receiver 106.

Referring again to decision 608, if processor 204 determines that a current reference background image is not available, processor 204 encodes the entire background portion for received frame to produce an encoded background image at block 614. Processor 204 can encode the background portion using a conventional I-Frame compression method. The background portion can be encoded, for instance, using H.264 intra-coding, JPEG, JPEG 2000, and others of similar type. Illustratively, the background portion can be divided into 8×8 pixel blocks, which can be individually encoded. Each block can be transformed using a spatial-to-frequency transformation, such as discrete cosine transform (DCT). The transformed blocks can then be quantized or reduced in some fashion to decrease the amount of data.

At block 616, processor 204 decodes the background image that was previously encoded at block 614. After decoding the background image, processor 204 stores the image in a buffer of memory 206 as the new reference background image. As discussed, by decoding and generating new reference background images in this manner, processor 204 can synchronize its background images with the background images generated by receiver 106. Doing so supports accurate decoding of the video stream.

At block 618, processor 204 transmits the encoded background image (for example, either the residual or entire background image) to receiver 106 based on a specified update rate for the background (for example, 5, 10, 15 minutes). The update rate for the background can be slower than the update rate for foreground-objects. In some implementations, a background image can be updated in a block or image based manner. For example, an encoded residual background image can be divided into and transmitted in several parts or slices. Each slice is transmitted to receiver 106 at different times or over different interval periods. For example, processor 204 can be configured to provide receiver 106 with updated background images every ten minutes. Processor 204 can further be configured to divide encoded background images into five background slices. As a result, processor 204 transmits one background slice to the receiver 106 every two minutes over a ten minute span. In doing so, receiver 106 is able to obtain an updated background image within the specified update rate. Processor 204 can, under some circumstances, delay the transmission of a background image or slice based on defined priority rules and/or criteria. For example, processor 204 can delay the transmission of a background slice based on the number of and/or bandwidth requirements for encoded foreground-objects currently in queue for transmission to receiver 106.

Processor 204 transmits the encoded background image via communication subsystem 208, which can include a connection to receiver 106. For example, communication subsystem 208 can be connected to receiver 106 over a closed loop communications system. Transmission of the encoded background image is preferably facilitated by a suitable transport layer protocol, such as the transmission control protocol (TCP) or the user datagram protocol (UDP). In some implementations, processor 204 checks with receiver 106 whether transmission of the background image is successful.

Figure 7:
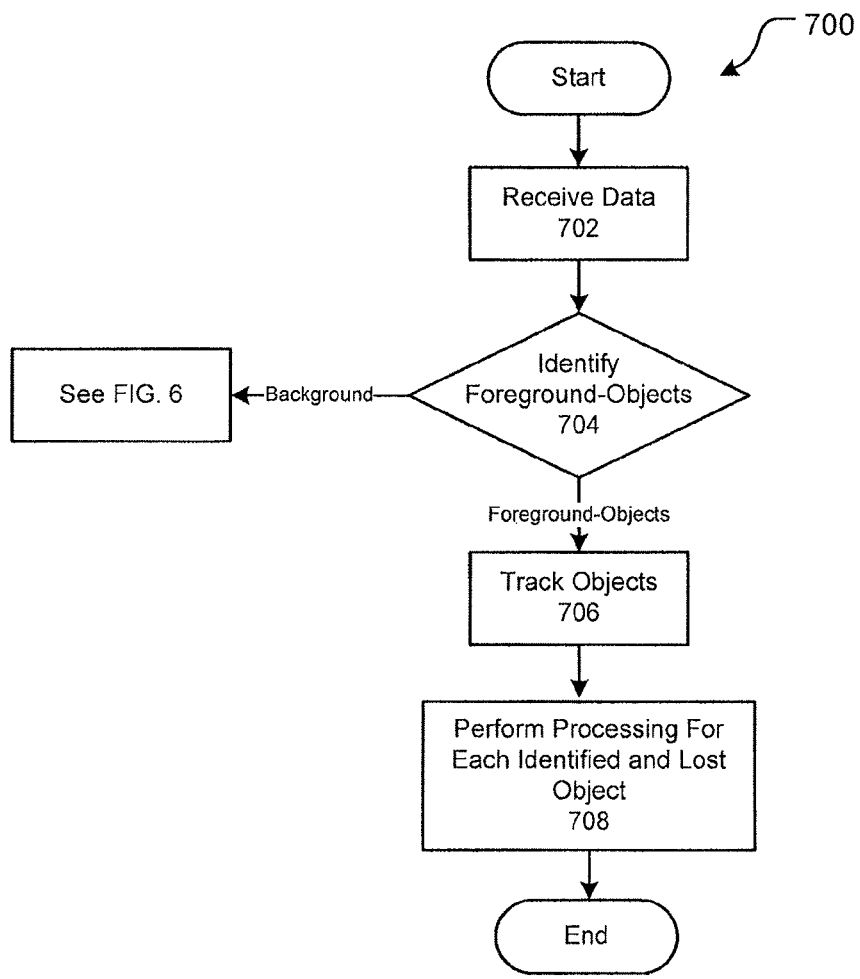
FIG. 7 is a block flow diagram of an exemplary process for encoding and transmitting foreground-object images.

Referring to FIG. 7, with further reference to FIGS. 1 and 2, process 700 for encoding and transmitting foreground-objects includes the blocks shown. Process 700 is, however, exemplary only and not limiting. Process 700 can be altered, e.g., by having blocks added, removed, rearranged, and/or performed concurrently. Blocks 702 and 704 can be the same as blocks 602 and 604 shown in FIG. 6.

At block 702, transmitter 102 receives a video frame from a suitable device. For example, an image sensor of imaging device 202 can capture image data for transmitter 102. As another example, image data can be received via I/O subsystem 210 and/or communication subsystem 208 (for example, via an Ethernet port, USB port, or wireless connection of the subsystems). Video frames can be received at regular intervals or at certain frame rates. For example, the transmitter can receive frames at 30 or 60 frames per second.

At block 704, processor 204 of transmitter 102 identifies foreground-objects in the received video frame. In particular, a scene analyzer algorithm can be implemented in the processor 204. The analyzer utilizes a Gaussian mixture model for excluding static background images and images with repetitive motion without semantic significance (for example, trees moving in the wind) to identify foreground pixels. The Gaussian mixture model can be based on multiple (for example, three or more) Gaussian curves. The Gaussian mixture model can additionally be based on previously received video frames. While the scene analyzer is described as utilizing a Gaussian mixture model, any model that captures stable pixels over a short period can be used.

Processor 204 groups any identified foreground pixels into blobs using a connected components analysis. The grouped blobs represent the foreground-objects detected in the received video frame. To eliminate noise from the frame, processor 204 removes noisy blobs. Identifying if an object candidate is a real object or if it is a part of the noisy background of the scene can be difficult. For example, moving flags and tree branches are not very informative and should be ignored to save transmission bandwidth. If an object is identified as a true object, it will be coded and transmitted. At the same time, some part of the scene will change and some still objects can become a part of the background. When this happens, this part of the background should be updated for transmission. To filter out noises from the foreground objects, processing is done in three levels: pixel level, block level, and object level. At the pixel level, the Gaussian mixture model will adapt the environment dynamically and ignore the frequent movement of the same objects such as tree branches and flags. At the block level, the image is divided into M×M pixels blocks. For each block, the motion pixels in the current frames are compared with motion pixels in the previous frame. If any change is detected, a counter for the block will be triggered if the number of pixels with motion change is greater than a threshold. If the accumulated count in the counter is larger than a threshold in a period, this block will be labeled as a noisy block in a noise mask buffer. All of the motion within the noisy block will be ignored. At the object level, if an object is detected always moving locally and changing direction frequently for a certain time, it will be labeled as noise and will not be updated as an object. The area that the object visits will be marked as a noisy area on the noise mask. Only motion pixels not marked as noise pixels will be labeled for further processing.

At block 706, processor 204 tracks any identified foreground-objects. In particular, processor 204 labels any identified foreground-objects by assigning the computed metadata to the objects.

Based on the labels, processor 204 attempts to map each detected object with an object identified in a previously received frame. For example, processor 204 can compare the position, speed, movement direction, color, object size, and others of similar type, to map an object. Illustratively, processor 204 can estimate that, based on the upward trajectory of an object, the object would be an estimated 50 pixels below its current position in a previously received frame. Based on this determination, processor 204 checks whether, in a previously received frame, an object is shown at the estimated position.

Through tracking the identified foreground objects, processor 204 also determines if any objects have been lost. More specifically, processor 204 identifies objects present in a previously received frame that are no longer present in the received frame (for example, an object has left the field of view of the frame, moved behind another object, and others of similar type). Processor 204 can identify lost objects in any suitable manner. For example, processor 204 can maintain an objects list containing information for objects present in a previously received frame. If an object in the list is not found in the current frame, processor 204 determines that the object has been lost. As another example, processor 204 can compare the foreground-objects of a previous frame to the foreground-objects of the received frame. Based on the comparison, processor 204 identifies any objects missing in the received frame.

In some implementations, processor 204, in tracking the identified foreground objects, additionally filters out objects that are considered to be noise. More specifically, processor 204 can delay the processing of a newly detected foreground object until processor 204 has detected the presence of the foreground object in a threshold number of consecutive frames. In order not to miss any true objects that should be transmitted, all of the objects are coded in a queue. The queue will buffer a number of images and background blocks that need to be updated. If an object is in queue for too long and it is not recognized as a true object, it will be removed from the buffer. If an object is detected as a true object, all of the buffered objects with the same object identifier will be transmitted.

At block 708, processor 204 processes the identified and lost foreground-objects. For example, processor 204 can generate a lost event for each object that is identified as not present in the received frame. As another example, processor 204 can determine if a particular identified object is moving, still, new (that is, not identified in previous frames), and/or the like. Processor 204 can additionally compute, encode, and decode object images for the identified objects. Processor 204 can also, based on movement information, determine update rates for identified objects. Illustratively, if an identified object is moving very slowly, processor 204 can determine that an image for the object can be updated at a slower rate (for example, an image for the object does not need to be frequently transmitted and/or the current image for the object does not need to be transmitted). Processor 204 can furthermore transmit data for each object to receiver 106 based on a specified update rate. Processor 204 can also process the identified and lost foreground-objects sequentially or in parallel. Process 800, shown in FIG. 8, illustrates the processing of identified foreground-objects and lost foreground-objects in greater detail.

Figure 8:
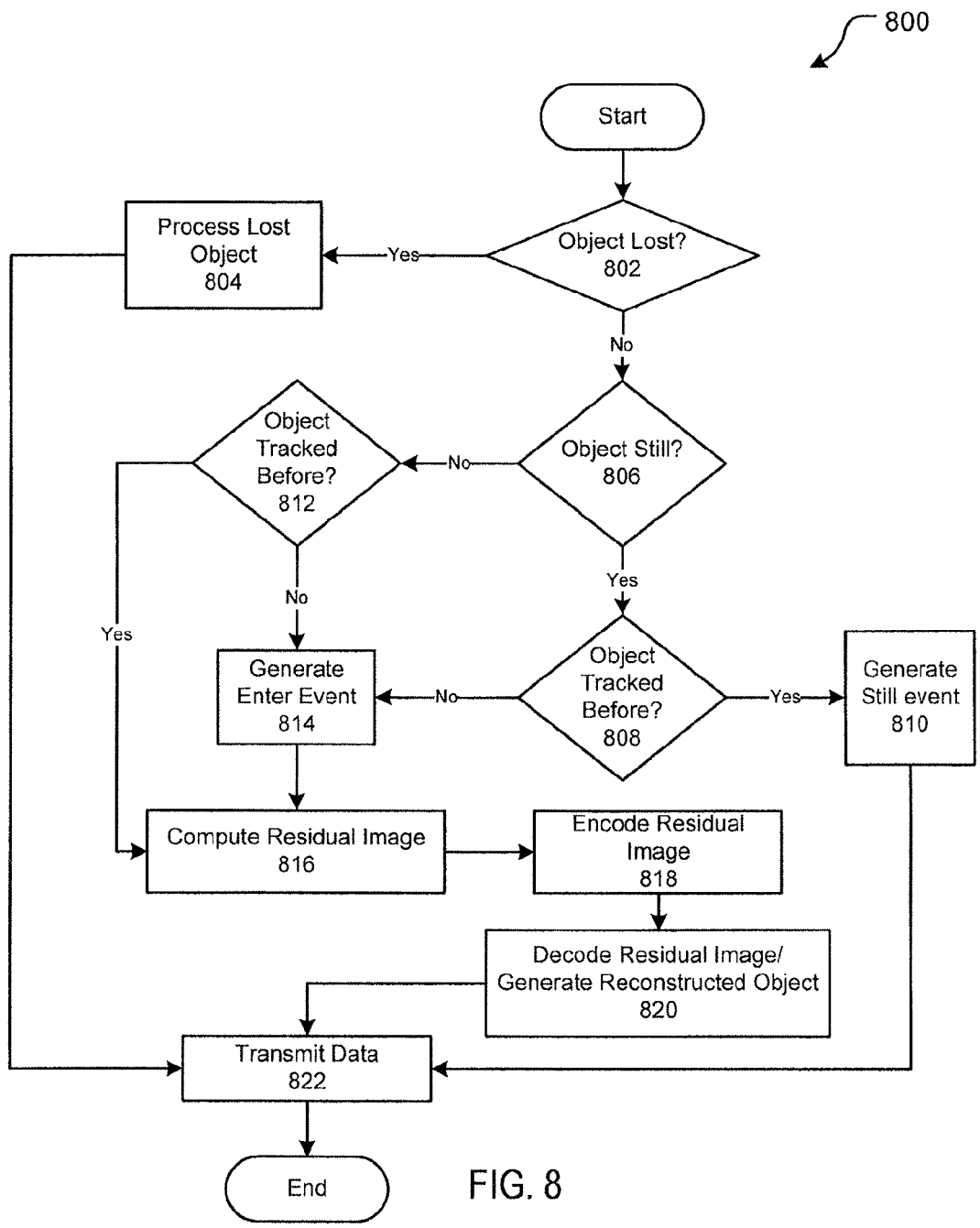
FIG. 8 is a block flow diagram of an exemplary process for supporting the encoding and transmission of a foreground-object image.

Referring to FIG. 8, with further reference to FIGS. 1 and 2, process 800 for supporting the encoding and transmission of an object includes the blocks shown. Process 800 is, however, exemplary only and not limiting. Process 800 can be altered, for example, by having blocks added, removed, rearranged, and/or performed concurrently. For example, block 822 for transmitting data can be performed prior to block 820. Still other alterations to the process 800 as shown and described are possible.

At decision 802, processor 204 initiates processing based on a determination as to whether an object is lost. If the object is lost, processor 204 generates a lost event (for example, "object_leave_scene" event) for the object at block 804. In some implementations, the background region corresponding to the position where the lost object was previously present is updated accordingly. The regional background updating process is similar to the updating of a background shown in FIG. 6 (via encoding of an entire or residual background image), except that only a region of the background is coded. Information regarding the location of the region of the background to be updated is transmitted with the coded background.

If an object is not lost, processor 204 determines whether the object is stationary or still at decision 806. Processor 204 can determine whether an object is still by using previously computed metadata (including movement and position information) for the object. For example, processor 204 can use position information to compare the coordinates of the object in the received frame to the coordinates of the object in a previously received frame. These still objects are classified as foreground pixels that need to be coded and transmitted as discussed above. However, if they are sent every frame, too much bandwidth is wasted since they are the same as the previous frames. One exemplary method is to code the location of the object and ask the decoder to copy the area of the previous frame to the background image. This will save a lot of bandwidth but still the encoder needs to transmit some information about the object for every frame before the object disappears from the scene or merges into the background. Another exemplary method is to update the background model immediately and code this object as background. Since the object is updated into the background, it doesn't need to be transmitted for the future frames. In order to do this, the probability of the Gaussian model for each pixel in the object area should be updated to make sure it will be recognized as background instead of object. The image block will be coded forcedly as background.

This exemplary embodiment utilizes two background images. One background image is a current background image (CBI) which is used as a reference image for coding and decoding. The other background image is the evolving background image (EBI) which is updated along with incoming frames based on motion detection and it will be updated as current background image and coded for transmission when it is necessary. If a pixel is detected as a background pixel, the corresponding evolving background model will be updated with a moving average method. If an object is detected as a still object, the pixels in the area in the current frame will be updated into the current background image and evolving background image. Background models are for motion detection and noise filtering, and the background image is for coding. The background models can be processed with a reduced size image such as used in a scene analyzer. The background image should be the same size as the input image.

Since we are using a Gaussian mixture model, it is possible that there are more than one models corresponding to the background. There is only one background image in the buffer.

For the best visual performance, the background image should be as close as possible to the original image even though the background is dynamically changed. In an exemplary embodiment two counters are used for each Gaussian model. One counter is a long-term counter (LTC) to count the long term probability. The other counter is a short-term counter (STC) which counts the probability in the past short term period. The long term counter is used to determine if the current pixel is a foreground pixel or not, and the short term counter is used to decide which Gaussian model should be used for the background image. The following is some exemplary criteria for background pixel selection. If an object is classified as a still object, the pixels in the area in the current frame will be used as background pixels and their short term counter values will be maximized and the long term counter values will be updated to make sure the pixels will be classified as background pixels. These pixels will be labeled to be updated immediately as background pixels and the current background image and evolving background image buffers will be updated at the same time. Otherwise, the most probable model with the highest short term counter value is selected and its mean values are used as current background pixel values. The evolving background image will be compared with the current background image. If the difference between the two background images is large, the evolving background image will be coded and updated as the current background image. The coding of the evolving background image is differential coding with the current background image.

At decision 808, processor 204 determines whether the foreground-object has been previously tracked. Processor 204 can determine whether an object has been previously tracked in any suitable manner. For instance, processor 204 can maintain an objects list containing information for objects present in a previously received frame. In order to determine whether an object has been previously tracked, processor 204 checks whether the object is present in the list. As another example, processor 204 can determine whether an object has been previously tracked by comparing a previous frame to the current frame. In particular, processor 204 checks if the object appears in both frames.

If processor 204 determines that the foreground-object has been previously tracked at decision 808, processor 204 generates a still event (for example, "object_still" event) at block 810. Because the object is currently still, an encoded image of the object does not need to be immediately transmitted. The still object can, instead, be transmitted based on a slower rate or at the same rate as the background. The processing of a still object for transmission can proceed in a manner similar to that shown in blocks 816, 818, 820, and/or 822, except that encoding and decoding can be based on a previously stored image (for example, a previously stored image of the object, a previously stored frame) instead of a reference background image. In some implementations, the previously stored image can be an image that was previously reconstructed or generated. In some implementations, a still object can be merged into or considered a part of the background. When this happens, the corresponding background region is updated accordingly. The regional background updating process is similar to the updating of a background shown in FIG. 6 (via encoding of an entire or residual background image), except that only a region of the background is coded. Information regarding the location of the updated background region is transmitted with the coded background.

Referring again to block 806, if processor 204 determines that a foreground-object is not still, processor 204 determines if the object has been previously tracked at block 812. If processor 204 determines that the object has not been previously tracked at block 812, processor 204 generates an enter event (for example, "object_enter_scene" event) at block 814.

At block 816, processor 204 computes a residual object image for the foreground-object based on a current background image. In particular, processor 204 determines the difference (for example, via a subtraction process) between the block of pixels representing the foreground-object and the corresponding block of pixels in the reference background image. At block 818, processor 204 encodes the residual object image. Processor 204 can encode the residual object using any suitable coding scheme. For example, processor 204 can use JPEG, JPEG 200 or H.264 intra-coding.

In an alternative implementation, processor 204 can compute a residual object image based on a previously reconstructed image (for example, a previously reconstructed image of the object, a previously reconstructed frame). In particular, because the locations of an object in the received frame and in previous frames are known, processor 204 can estimate a global motion vector for the object's movement. Based on this global movement estimation, processor 204 can estimate local motion vectors via, for example, SAD or a correlation search based on 8×8 image blocks. The local motion vectors can thereafter be coded with the Huffman code of MPEG-4. Based on the vector estimations, a residual object image can subsequently be generated based on a previously reconstructed image. The residual object image can be encoded using any suitable coding scheme, such as MPEG based and/or H.264 inter-frame coding. By using global motion vectors for an object, local motion vectors of an object image block can be smaller than an image block without global motion estimation.

At block 820, processor 204 decodes the residual object image previously encoded at block 818. Processor 204 thereafter generates a reconstructed object image (for example, via an adding process) based on the decoded residual object image and a reference background image or previous frame alternatively depending on different encoding modes. After generating the reconstructed object image, processor 204 can store the object image in memory 206 (for example, in the objects list stored in memory 206). By decoding and generating a reconstructed object image, processor 204 can synchronize the object image with the object image decoded at and generated by receiver 106.

At block 822, processor 204 transmits data to receiver 106 based on a specified update rate for foreground-objects (for example, 15, 24, 29, 30, or 60 frames per second). Transmitted data can include event information (for example, object has been lost, a new object has entered the frame, and others of similar type) and/or encoded image data. For instance, a video stream can be presented to a user at a rate of 30 frames per second. As a result, updated foreground-object images are sent to the receiver 106 at 1/30 second intervals.

In some implementations, processor 204 can transmit the image data via communication subsystem 208, which can include a connection to receiver 106. For example, communication subsystem 208 can include a connected to receiver 106 over a Wide Area LAN (for example, the Internet). Transmission of the encoded background image can be facilitated by any suitable transport layer protocol, such as TCP or UDP. In some implementations, processor 204 checks with receiver 106 whether transmission of the object images is successful.

In some implementations, processor 204 can transmit image data for objects based on movement and/or size thresholds. For example, processor 204 can be configured to only transmit encoded image data for an object if the object has moved at least 20 pixels between frames or if the object has changed from a size of 50 pixels to 100 pixels. Processor 204 can automatically modify the movement/size thresholds based on the current availability of bandwidth.

In certain implementations, processor 204 can store image data (for example, encoded object images, background images, etc.) in a transmission buffer. The buffer can be used to temporarily store image data during periods where bandwidth is not high enough to transmit all image data flagged to be sent to receiver 106. Processor 204 may not be able to transmit all image data to receiver 106 if for example, a recently processed frame includes a large amount of motion.

In some implementations, processor 204 can additionally set transmission priorities for encoded object and background images. For example, images for a moving object can be associated with a high priority. Images for stationary objects and backgrounds can be associated with lower priorities. Processor 204 can thereafter transmit images based on the defined priorities (that is, high priority data is sent before low priority data). In some implementations, processor 204 can increase the priority of an image based on the time the data has remained in the transmission buffer. For example, processor 204 can increase the priority of an image if the image has been in the buffer for more than two minutes.

It should be appreciated that the processes shown in FIGS. 6, 7, and 8 can be executed concurrently or sequentially.

Figure 9:
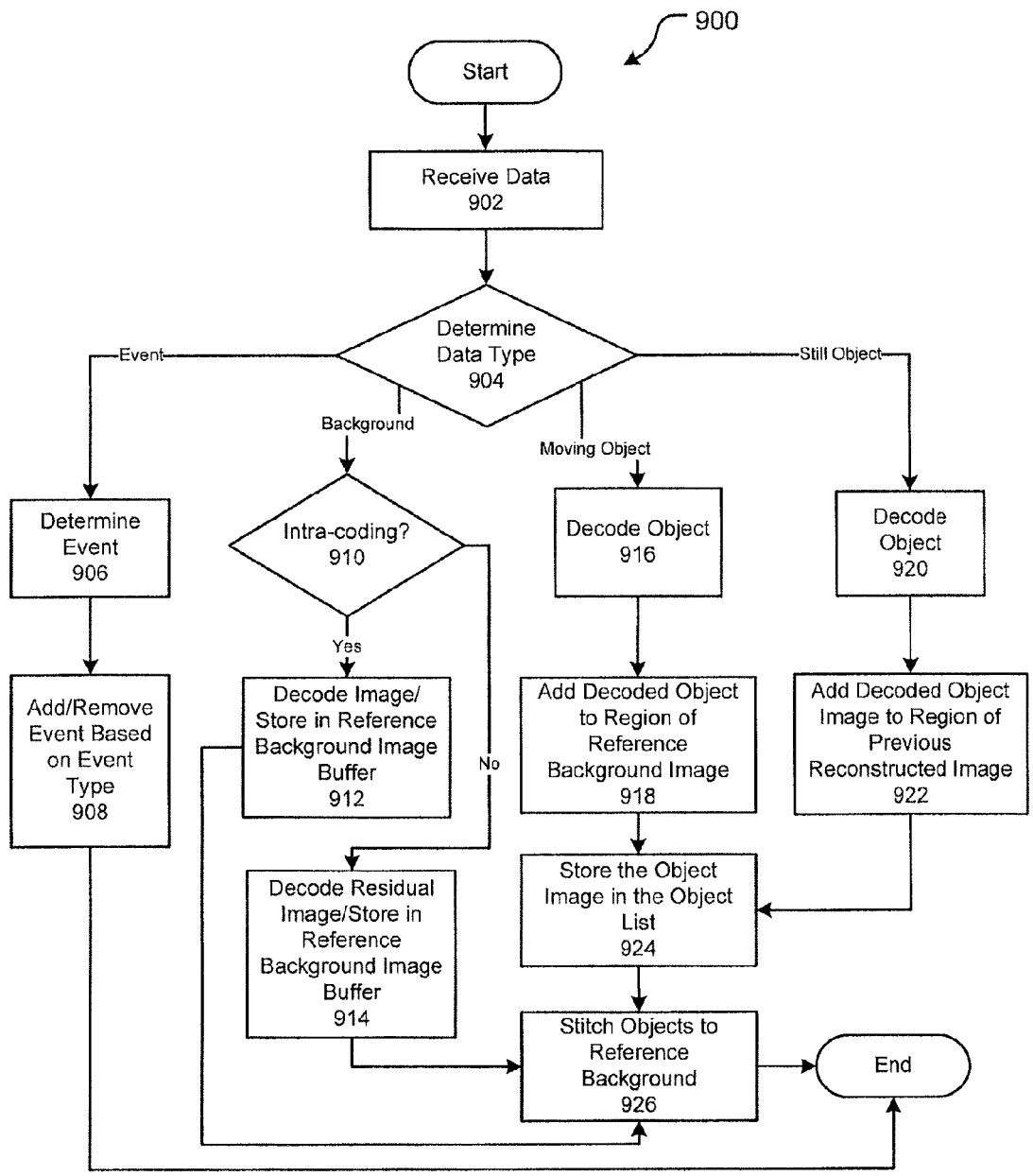
FIG. 9 is a block flow diagram of an exemplary process for decoding video data.

Referring to FIG. 9, with further reference to FIGS. 1 and 3, process 900 for supporting the decoding of video data includes the blocks shown. Process 900 is, however, exemplary only and not limiting. Process 900 can be altered, e.g., by having blocks added, removed, rearranged, and/or performed concurrently.

At block 902, receiver 106 receives data from transmitter 102. The data can include event information (for example, enter event, lost event, and others of similar type), encoded residual object images, encoded residual background images, entire encoded background images, and/or the like. At decision 904, processor 304 of receiver 106 determines a data type (for example, event, background, moving object, still object) for the received data.

If processor 304 determines that the received data belongs to an event data type at decision 904, processor 304 identifies the specific event indicated by the data at block 906. For example, the received data can indicate that an object has entered a current frame (for example, "object_enter_scene" event). As another example, the received data can indicate that an object has left a current frame (for example, "object_leave scene" event). At block 908, processor 304 adds or removes an object from an objects list based on the event indicated by the received data. For instance, processor 304 may have determined that the received event data indicates that an object has entered a current frame. Based on this determination, processor 304 adds the object to the objects list. As another example, processor 304 may have determined that the received data indicates that an object has left a scene. As a result, processor 304 removes the object from the objects list.

Referring again to decision 904, if processor 304 determines that the data received from transmitter 102 is of a background type (for example, an encoded residual background image or an entire encoded background image), processor 304 determines whether intra-coding should be performed at decision 910.

If processor 304 determines that intra-coding is to be performed (that is, the received data is an entire encoded background image), processor 304 decodes the background image to produce a decoded background image at 912. Processor 304 thereafter stores the decoded background image in a reference background image buffer of memory 306. In doing so, the decoded background image replaces a current reference background image, and is used as the reference background image in later processing (for example, used in the stitching of an image for presentation to a user, in the decoding of subsequently received data, and others of similar type).

If processor 304 determines that intra-coding is not to be performed (that is, the received data is a residual background image), processor 304 decodes the residual background image to produce a decoded residual background image at 914. Processor 304 thereafter generates a new reference background image using the decoded residual background image and a current reference background image. Processor 304 subsequently stores the new reference background image in a reference background image buffer of memory 306. In doing so, the new reference background image replaces the current reference background image and is used as the reference background image in later processing.

Referring again to decision 904, if processor 304 determines that the data received from transmitter 102 is of a moving object type, processor 304 decodes the data, which is a residual object image, to produce a decoded residual object image at block 916. At block 918, processor 304 generates a reconstructed object image (for example, through an adding process) based on the decoded residual object image and a current reference background image or previous frame alternatively depending on different encoding modes. Upon generating the object image, the reconstructed object image can be stored in a buffer of memory 306.

Referring again to decision 904, if processor 304 determines that the data received from transmitter 102 is of a still object type, processor 304 decodes the data, which can be a residual object image, to produce a decoded residual object image at block 920. At block 922, processor 304 generates a reconstructed object image (for example, via an adding process) based on the decoded residual object image and a previously reconstructed image (for example, previously reconstructed image of the object, a previously reconstructed frame). An alternative way to reproduce a still object is to use the corresponding object image from the objects list directly. In some implementations, upon generating the object image, the reconstructed object image can be stored in a buffer of memory 306.

At block 924, processor 304 stores or references the generated object image in the objects list stored in memory 306. At block 926, processor 304 stitches any objects in the objects list to the current reference background image to generate a video frame. Processor 304 thereafter provides the video frame to, for example, display 302 for presentation to a user. In some implementations, processor 304 waits until all data received over a certain time period is processed before performing block 926. Illustratively, processor 304 may receive two pieces of video data including a first encoded object image and a second encoded object image over a $\frac{1}{30}$ second time period. Receiver 106 may process each of the images (for example, decode, and others of similar type) before stitching the images to a reference background image (which may have been received, decoded and stored, for example, five minutes prior), and presenting a generated video frame to a user.

Substantial variations to described configurations can be made in accordance with specific requirements. For example, customized hardware might also be used, and/or particular elements might be implemented in hardware, software (including portable software, such as applets, etc.), or both. Further, connection to other computing devices such as network input/output devices can be employed.

The terms "machine-readable medium" and "computer-readable medium," as used herein, refer to any medium that participates in providing data that causes a machine to operate in a specific fashion. Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code. Various forms of computer-readable media can be involved in carrying one or more sequences of one or more instructions to a processor(s), such as processors 204 and 304 of transmitter 102 and receiver 106 respectively, for execution. Merely by way of example, the instructions can initially be carried on a magnetic disk and/or optical disc of transmitter 102. Transmitter 102 might load the instructions into its dynamic memory and send the instructions as signals over a transmission medium to be received and/or executed by receiver 106. These signals, which might be in the form of electromagnetic signals, acoustic signals, optical signals and/or the like, are all examples of carrier waves on which instructions can be encoded, in accordance with various configurations of the invention.

The methods, systems, and devices discussed above are examples. Various configurations can omit, substitute, or add various procedures or components as appropriate. For instance, in alternative configurations, the methods can be performed in an order different from that described, and that various steps can be added, omitted, or combined. Also, features described with respect to certain configurations can be combined in various other configurations. Different aspects and elements of the configurations can be combined in a similar manner. Also, technology evolves and, thus, many of the elements are examples and do not limit the scope of the disclosure or claims.

Specific details are given in the description to provide a thorough understanding of example configurations (including implementations). However, configurations can be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes can be made in the function and arrangement of elements without departing from the spirit or scope of the disclosure.

Further, the preceding description details a video transmission system. However, the systems and methods described herein can be applicable to other transmission systems.

Also, configurations can be described as a process which is depicted as a flow diagram or block diagram. Although each can describe the operations as a sequential process, many of the operations can be performed in parallel or concurrently. In addition, the order of the operations can be rearranged. A process can have additional steps not included in the figure. Furthermore, examples of the methods can be implemented by hardware, software, firmware, middleware, microcode, hardware description languages, or any combination thereof. When implemented in software, firmware, middleware, or microcode, the program code or code segments to perform the necessary tasks can be stored in a non-transitory computer-readable medium such as a storage medium. Processors can perform the described tasks.

Having described several example configurations, various modifications, alternative constructions, and equivalents can be used without departing from the spirit of the disclosure. For example, the above elements can be components of a larger system, wherein other rules can take precedence over or otherwise modify the application of the invention. Also, a number of steps can be undertaken before, during, or after the above elements are considered. Accordingly, the above description does not limit the scope of the claims.

What is claimed is:

1. A method of video coding comprising:
receiving a video image having a plurality of pixels;
selecting a plurality of Gaussian models for each pixel in the plurality of pixels in the image;
using a long-term counter with each Gaussian model to determine if a current pixel is a foreground pixel or background pixel;
using a short-term counter with each Gaussian model to determine which Gaussian model to use for the current pixel of a current background image;
if a pixel is detected as a background pixel updating a corresponding evolving background image with a moving average method;
dividing the image into M×M pixel blocks, each block having motion pixels in a frame;
comparing for each block the motion pixels in a current frame with motion pixels in a previous frame to identify a number of pixels with motion change, and determine if the number of pixels with motion change is greater than a first threshold;
triggering a counter for a block if the number of pixels with motion change is greater than the first threshold;
determining if an accumulated count in the counter in a first predetermined period of time is larger than a second threshold;
designating a block for noise masking if the accumulated count in the counter in a first predetermined period of time is larger than the second threshold;
tracking objects in the image;
if an object is detected as a still object, updating the pixels in the area in the current frame into the current background image and evolving background image, and maximizing the short-term counters of the Gaussian models corresponding to the pixels in the area of the current frame and updating the long-term counters to ensure that the pixels will be classified as background pixels; and
if a pixel is detected as a background pixel and the background model for the pixel is different to the pixel in the previous frame, updating the pixel of both of the current and evolving background image and coding and transmitting the updated current background pixels;
determining if an object is always moving locally by detecting if an object is always moving within a predetermined distance and changing a direction of moving frequently for a second predetermined period of time;
removing an object from classification as an object if the determining step determines that an object is always moving locally;
ignoring the motion of an object if the determining step determines that an object is always moving locally and marking an area that the object moves within as a noisy area on a noise mask buffer;
updating background models based on motion detection and noise filtering;
updating a current background image with background update blocks defined therein;
updating an evolving background image; and
coding the current background image, background update blocks and objects for transmission.

2. A method as recited in claim 1 further comprising: creating a queue to buffer a plurality of entries in the queue including objects, background blocks and images that need to be updated; providing frame and object identifiers to entries in the queue; determining if an object is a true object; determining if an object is in a queue for a period of time greater than a third predetermined period of time; and removing an object from a buffer if the object has not been identified as a true object and it has been determined that the object has been in a queue for a period of time greater than the third predetermined period of time.

3. A method as recited in claim 1 wherein receiving a video image having a plurality of pixels comprises receiving a video image that was captured by a camera viewing a scene and further comprising determining if an object has moved into the scene and stopped in the scene, and if determining if an object has moved into the scene and stopped in the scene determines that a first object has moved into the scene and stopped, updating a background model of the scene and coding the first object as background.

4. A method as recited in claim 1 further comprising: establishing a current background image as a reference image for coding and decoding; establishing an evolving background image; updating the current background image with the still objects detected; updating the evolving background image with received images based on motion detection; and replacing the current background image with the evolving background image.

5. A method as recited in claim 1 wherein coding the current background image, background update blocks and objects for transmission comprises using a current background image and a previous decoded frame as potential reference images.

6. A system for video coding comprising:
a processor adapted to
receive a video image having a plurality of pixels,
select a plurality of Gaussian models for each pixel in the plurality of pixels in the image,
use a long-term counter with each Gaussian model to determine if a current pixel is a foreground pixel or background pixel,
use a short-term counter with each Gaussian model to determine which Gaussian model to use for the pixel of the current background image,
if a pixel is detected as a background pixel, update the corresponding evolving background model with a moving average method,
divide the image into M×M pixel blocks, each block having motion pixels in a frame;
compare for each block the motion pixels in a current frame with motion pixels in a previous frame to identify a number of pixels with motion chance and determine if the number of pixels with motion change is greater than a first threshold,
trigger a counter for a block if the number of pixels with motion change is greater than the first threshold,
determine if an accumulated count in the counter in a first predetermined period of time is larger than a second threshold, designate a block for noise masking if the accumulated count in the counter in a first predetermined period of time is larger than the second threshold,
track objects in the image,
if an object is detected as a still object, updating the pixels in the area in the current frame into the current background image and evolving background image, and maximizing the short-term counters of the Gaussian models corresponding to the pixels in the area of the current frame and updating the long-term counters to ensure that the pixels will be classified as background pixels; and if a pixel is detected as a background pixel and the background model for the pixel is different to the pixel in the previous frame, updating the pixel of both of the current and evolving background image and coding and transmitting the updated current background pixels;

determine if an object is always moving locally by detecting if an object is always moving within a predetermined distance and changing a direction of moving frequently for a second predetermined period of time, remove an object from classification as an object if the processor determines that an object is always moving locally, ignore the motion of an object if the determining step determines that an object is always moving locally and marking an area that the object moves within as a noisy area on a noise mask buffer;

update background models based on motion detection and noise filtering, update a current background image with background update blocks defined therein, update an evolving background image and code the current background image, background update blocks and objects for transmission.

7. A system as recited in claim 6 wherein the processor is further adapted to create a queue to buffer a plurality of entries in the queue including objects, background blocks and images that need to be updated; providing frame and object identifiers to entries in the queue, determine if an object is a true object, determine if an object is in a queue for a period of time greater than a third predetermined period of time, and remove an object from a buffer if the object has not been identified as a true object and it has been determined that the object has been in a queue for a period of time greater than the third predetermined period of time.

8. A system as recited in claim 6 wherein the processor is further adapted to receive a video image that was captured by a camera viewing a scene and to determine if an object has moved into the scene and stopped in the scene, and if the processor determines that a first object has moved into the scene and stopped, to update a background model of the scene and to code the first object as background.

9. A system as recited in claim 6 wherein the processor is further adapted to establish a current background image as a reference image for coding and decoding, establish an evolving background image, update the current background image with the still objects detected, update the evolving background image with received images based on motion detection, and replace the current background image with the evolving background image.

10. A system as recited in claim 6 wherein the processor is further adapted to use a current background image and a previous decoded frame as potential reference images.

11. A non-transitory computer readable medium comprising instructions configured to cause a processor to:
receive a video image having a plurality of pixels,
select a plurality of Gaussian models for each pixel in the plurality of pixels in the image, use a long-term counter with each Gaussian model to determine if a current pixel is a foreground pixel or background pixel, use a short-term counter with each Gaussian model to determine which Gaussian model to use for the pixel of the current background image, if a pixel is detected as a background pixel, update the corresponding evolving background model with a moving average method, divide the image into M×M pixel blocks, each block having motion pixels in a frame;

compare for each block the motion pixels in a current frame with motion pixels in a previous frame to identify a number of pixels with motion change, and determine if the number of pixels with motion change is greater than a first threshold, trigger a counter for a block if the number of pixels with motion change is greater than the first threshold, determine if an accumulated count in the counter in a first predetermined period of time is larger than a second threshold, designate a block for noise masking if the accumulated count in the counter in a first predetermined period of time is larger than the second threshold, track objects in the image, if an object is detected as a still object, updating the pixels in the area in the current frame into the current background image and evolving background image, and maximizing the short-term counters of the Gaussian models corresponding to the pixels in the area of the current frame and updating the long-term counters to ensure that the pixels will be classified as background pixels; and if a pixel is detected as a background pixel and the background model for the pixel is different to the pixel in the previous frame, updating the pixel of both of the current and evolving background image and coding and transmitting the updated current background pixels;

determine if an object is always moving locally by detecting if an object is always moving within a predetermined distance and changing a direction of moving frequently for a second predetermined period of time, remove an object from classification as an object if the processor determines that an object is always moving locally, ignore the motion of an object if the determining step determines that an object is always moving locally and marking an area that the object moves within as a noisy area on a noise mask buffer;

update background models based on motion detection and noise filtering, update a current background image with background update blocks defined therein, update an evolving background image and code the current background image, background update blocks and objects for transmission.

12. A non-transitory computer readable medium as recited in claim 11 further comprising instructions configured to cause the processor to: create a queue to buffer a plurality of entries in the queue including objects, background blocks and images that need to be updated; provide frame and object identifiers to entries in the queue; determine if an object is a true object; determine if an object is in a queue for a period of time greater than a third predetermined period of time; and remove an object from a buffer if the object has not been identified as a true object and it has been determined that the object has been in a queue for a period of time greater than the third predetermined period of time.

13. A non-transitory computer readable medium as recited in claim 11 further comprising instructions configured to cause the processor to: receive a video image that was captured by a camera viewing a scene; determine if an object has moved into the scene and stopped in the scene, and if the processor determines that a first object has moved into the scene and stopped, updating a background model of the scene and coding the first object as background.

14. A non-transitory computer readable medium as recited in claim 11 further comprising instructions configured to cause the processor to: establish a current background image as a reference image for coding and decoding; establish an evolving background image; update the current background image with the still objects detected; update the evolving background image with received images based on motion detection; and replace the current background image with the evolving background image.

15. A non-transitory computer readable medium as recited in claim 11 wherein the instructions configured to cause the processor to of code the current background image, background update blocks and objects for transmission comprise instructions configured to cause the processor to use a current background image and a previous decoded frame as potential reference images.

* * * * *

UNITED STATES PATENT AND TRADEMARK OFFICE
CERTIFICATE OF CORRECTION

PATENT NO. : 9,681,125 B2
APPLICATION NO. : 13/340564
DATED : June 13, 2017
INVENTOR(S) : L. Wang et al.

It is certified that error appears in the above-identified patent and that said Letters Patent is hereby corrected as shown below:

In the Claims

In Claim 6, Column 22, Line 54, delete "chance" and insert --change--

In Claim 6, Column 23, Line 22, delete "step"

In Claim 11, Column 24, Line 48, delete "determining step" and insert --processor--

Signed and Sealed this
Tenth Day of April, 2018

Andrei Iancu
*Director of the United States Patent and Trademark Office*